United States Patent [19]

Wormser

[11] Patent Number: 4,909,884

[45] Date of Patent: Mar. 20, 1990

[54] BANNER MANUFACTURING SYSTEM

[75] Inventor: Robert S. Wormser, Ocala, Fla.

[73] Assignee: Ranger International, Inc., Ocala, Fla.

[21] Appl. No.: 368,105

[22] Filed: Jun. 19, 1989

Related U.S. Application Data

[63] Continuation of Ser. No. 151,074, Feb. 1, 1988, abandoned.

[51] Int. Cl.[4] .......... B32B 31/18

[52] U.S. Cl. .......... 156/248; 156/252; 156/253; 156/268; 427/272; 427/282

[58] Field of Search .......... 156/62, 248, 252, 253, 156/267, 268, 270, 344; 40/584, 594, 595, 624; 427/143, 146, 147, 272, 282; 83/171, 861, 879, 880, 881, 886

[56] References Cited

U.S. PATENT DOCUMENTS

| | | | |
|---|---|---|---|
| 2,876,575 | 3/1959 | Leika | 156/248 |
| 3,537,874 | 11/1970 | Ramey | 427/272 |
| 3,810,812 | 5/1974 | Koenig | 156/248 |
| 4,512,839 | 4/1985 | Gerber | 156/248 |

OTHER PUBLICATIONS

Sungraf Automated Systems, Graphion, 311 West Ansin Boulevard, P.O. Box 429, Hallandale, Fla. 33009, copyright 1986.

Now Anything You Could Do, You Can Do Bigger!, GSP, P.O. Box 105, Hartford, Conn. 06141.

*Primary Examiner*—Caleb Weston

*Attorney, Agent, or Firm*—Beaman & Beaman

[57] ABSTRACT

A system for manufacturing a banner consisting of an elongated flexible strip upon which indicia is located wherein the indicia is formed by computer-controlled apparatus. A masking material is directly laminated to the banner face and, preferably, the lateral edge regions of the banner are provided with drive and orientation holes cooperating with drive structure of a computer-controlled cutting machine through which the laminated banner and mask are fed. The computer-controlled cutter slits only the masking material to define the desired indicia and the unwanted portions of the masking material are then peeled from the banner face. The remaining masking material may form the indicia itself, but in the preferred embodiment, the exposed banner face is coated, as with paint, and after drying, the remaining masking material is removed from the banner face to produce a long-lasting banner having painted indicia defined thereon.

1 Claim, 1 Drawing Sheet

BANNER MANUFACTURING SYSTEM

This is a continuation of Ser. No. 151,074, filed on Feb. 1, 1988, now abandoned.

BACKGROUND OF THE INVENTION

While the use of computer-controlled and driven plotters has simplified the manufacture of indicia-bearing banners, the conventional process for forming a banner with a computer-driven plotter is still relatively slow and expensive and requires special skills. In the conventional process for forming a computer-generated banner, a flexible vinyl panel having a pressure-sensitive adhesive affixed to one side is laminated to an elongated paper strip having holes defined adjacent its lateral edges. The laminated vinyl material and paper is inserted into a computerized sign-making machine and the vinyl is slit or "kiss-cut" as desired to form the desired indicia. Thereupon, the excess or undesired vinyl is striped away from the paper so that only the vinyl letters and indicia remain. Thereupon, a transfer tape is then applied to the kiss-cut indicia and the banner material is prepared to receive the kiss-cut indicia.

In the next conventional step the kiss-cut indicia and the transfer tape are laminated to the prepared banner material. After the letters are firmly attached to the banner material the transfer tape is removed from the indicia letters whereby the kiss-cut vinyl letters with their pressure-sensitive adhesive will be affixed to the banner face.

In the practice of conventional banner making considerable skill is required when transferring the indicia to the banner and as the indicia carried on the banner consists of the adhesive-faced letters and the like adhering to the banner it is possible for the letters to be inadvertently removed from the banner as may happen when the banner is subjected to wind, rain, snow and ice and other adverse conditions. The extensive labor and skills required to form a banner in the above manner requires a considerable investment in time, and material, and while banners constructed in the aforesaid manner may be more economically produced than banners not utilizing computer-driven cutters, the expense of producing such a banner is relatively high.

It is an object of the invention to provide a banner fabrication system utilizing a computer-driven cutter wherein the formation of the banner is simplified with respect to conventional banner construction methods and a superior banner results.

Another object of the invention is to provide a banner fabrication system utilizing a minimum of materials.

Yet a further object of the invention is to provide a banner fabrication system wherein the indicia is defined by computer-controlled apparatus, the material requirements are minimal, and no special skills are required by the operator.

An additional object of the invention is to provide a banner fabrication system utilizing a minimum of materials and requiring minimal skills and yet the resulting banner is of a long life and the indicia defined thereon is permanently affixed to the banner base material.

In the practice of the invention the banner base material usually consists of an elongated strip of flexible vinyl having parallel lateral edges and edge regions formed adjacent the edges. A central region exists between the lateral edge regions and the indicia, ultimately, is to be defined at the banner central region intermediate the lateral edges.

Preferably, the first step is to feed the banner material through a perforating machine wherein a plurality of spaced holes are defined in the banner edge regions adjacent the lateral edges. The spacing and configuration of these holes corresponds to the drive and orientation pins of the computer-controlled plotter and cutting machine which will define the indicia.

The perforated banner material then has a flexible masking tape laminated thereto. Usually, the masking tape will be a vinyl having a pressure-sensitive adhesive located upon the face which engages the face of the banner material wherein the mask material will be in intimate engagement with the banner face.

The laminated banner and mask material are then run through a computer-driven plotter having drive wheels having pins which are received within the banner orientation holes insuring a positive and accurate movement of the laminated banner through the plotter. As the laminated banner and mask material move through the plotter a cutter carried by the plotter operated by a computer slits the mask material only in a "kiss-cut." The banner is not cut by the plotter tool.

After the mask material is slit as desired the unwanted mask material is removed from the banner face. If the mask material itself is to define the banner indicia the unwanted mask material is removed by peeling or "weeding" the mask material from the banner face and the remaining mask material laminated to the banner face will form the indicia. Usually, the unwanted material will comprise the indicia defining the letters or other indicia so that the banner face will be exposed where the letters are to be formed, and by painting with either a brush or roller, paint may be directly applied to the banner face after the mask material has been removed therefrom. Thereafter, upon the paint drying the remainder of the mask material may be removed and a banner having painted indicia is produced.

In the practice of the invention only the banner material and the mask material are required. No transfer tape is necessary, and no separate highly skilled step of transferring indicia or letters from one material to the banner face is required. The removal of the unwanted mask material may be accomplished with minimum skill and the applying of the paint to the banner face by spray painting, brushing or rolling does not require any special skills.

BRIEF DESCRIPTION OF THE DRAWINGS

The aforementioned objects and advantages of the invention will be appreciated from the following drawings wherein.

BRIEF DESCRIPTION OF THE PREFERRED EMBODIMENT

Figure 1:
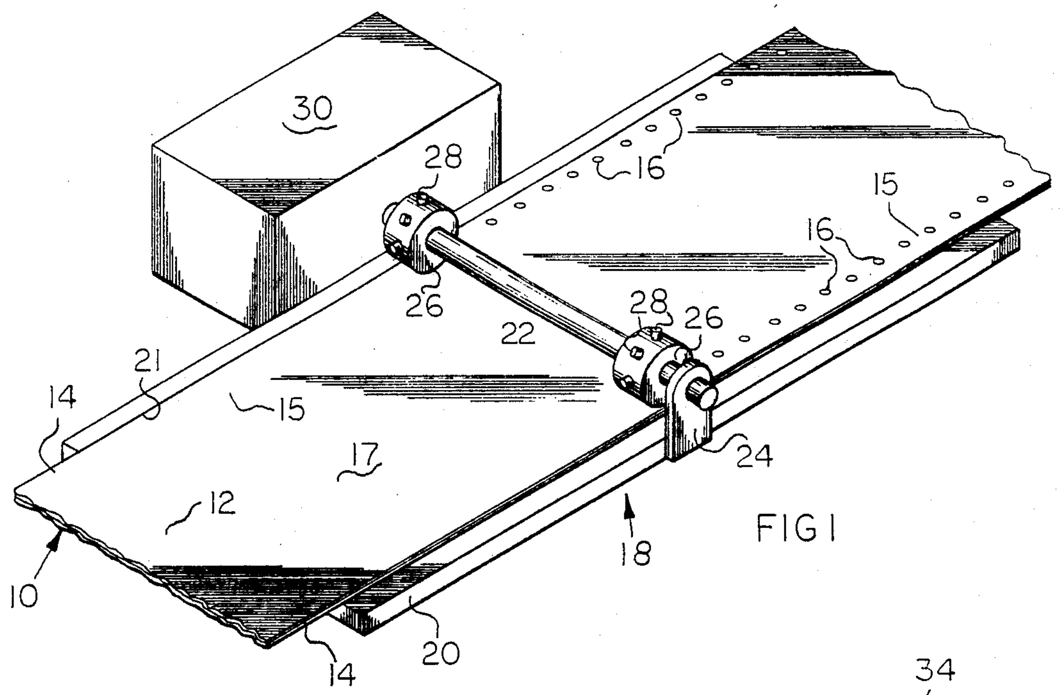
FIG. 1 is a perspective view of a banner in accord with the invention being located upon a perforating machine and being perforated adjacent its lateral edges.
Figure 2:
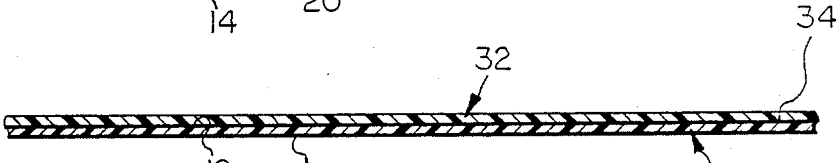
FIG. 2 is a sectional view through the banner illustrating the laminated mass material and banner material prior to cutting of the indicia.

A banner in accord with the invention is illustrated in FIG. 1 wherein the banner body is generally indicated at 10. The banner body is preferably formed of a flexible material and may be of vinyl fabric or the like, and is often approximately 24–36 inches in width and 4–20 feet in length. Preferably, the banner material includes a surface or face 12 upon which the indicia will be located. The parallel lateral edges of the banner are indicated at 14, and edge regions indicated at 15 extend parallel to the lateral edges and slightly inwardly thereof toward the banner central region 17 located between the edge regions 15. Preferably, a plurality of drive and orientation holes 16 are defined in the edge regions 15 and these holes are formed by the perforating machine generally indicated at 18.

The perforating machine 18 includes a table 20 upon which the banner 10 rests, and the table includes guide fences 21 for engaging the edges of the banner to stabilize the banner body 10 upon the table 20 as it moves thereacross. The perforating machine includes a shaft 22 journaled at 24, and a plurality of spaced hubs 26 are affixed upon the shaft 22. Each of the hubs 26 include a plurality of radially extending cylindrical punches 28 which form the holes 16 as the banner passes under the punches. The shaft 22 is driven by an appropriate transmission and motor (not shown) within housing 30.

After the drive and orientation holes 16 have been formed in the lateral edge regions 15 of the banner body 10 a flexible indicia-forming mask material or tape 32 is laminated to the banner body face 12. The mask material 32 may also be of vinyl, or could be of paper or the like. The mask material includes a pressure-sensitive adhesive 34 on the face engaging the banner face 12 and in this manner an integral lamination consisting of the banner body and the mask material is defined. The mask material edge's 36 are parallel to each other and spaced apart a distance less than the spacing between the banner material edges 14 as will be apparent from FIG. 3.

The laminated banner 10 and mask material 32 are then fed through a computer-controlled plotter 38 which may be of the type manufactured by Gerber Scientific Products Inc. of Hartford, Conn., Model S/750. The plotter 38 is controlled by a computer, not shown, and this technology is conventional and forms no part of the present invention. The plotter 38 is mounted upon a stand 40, and the plotter includes a cutter 42 mounted upon control rods 44 wherein the cutter 42 may rapidly move along the control rods and across the face of the banner and mask material laminate.

Figure 3:
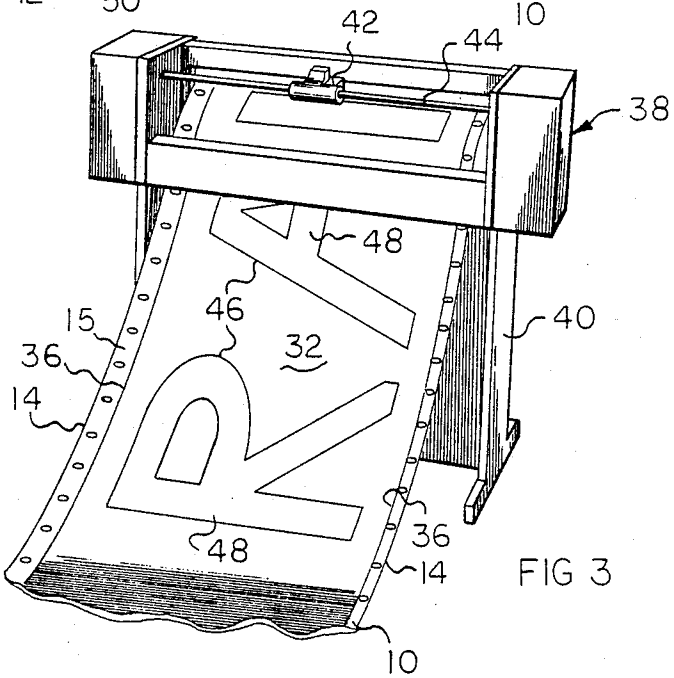
FIG. 3 is a perspective view illustrating the laminated banner and mask material as located within a computer controlled plotter "kiss-cutting" the indicia in the mask material.

The plotter includes drive rollers, not shown, having pins which are received within the banner holes 16, and in this manner a positive and accurate movement of the banner lamination through the plotter is assured. As the banner moves through the plotter, the cutter 42 is transversely driven across the banner face and the cutter 42 "kiss-cuts" the mask material 32 slitting the same without cutting into the banner material. The indicia edges 46 consist of slits in the mask material 32 as formed by the cutter 42, and the indicia 48 may consist of letters as shown in FIG. 3.

After the laminated banner assembly has been completely cut the unwanted mask material is then removed or "weeded" from the banner face 12. Usually, this will consist of removing the banner material defining a letter such as at 48, FIG. 3, to expose the banner surface 12. However, it is also possible to remove the mask material adjacent the indicia 48 leaving the indicia adhering to the banner face 12.

If the banner is to be of the painted type, which is the type usually manufactured by the process of the invention, after the mask material has been removed at the indicia 48, paint is applied to the exposed banner 12 by spraying, brush or roller. After the paint has dried, the remaining mask material may be removed from the face 12.

Figure 4:
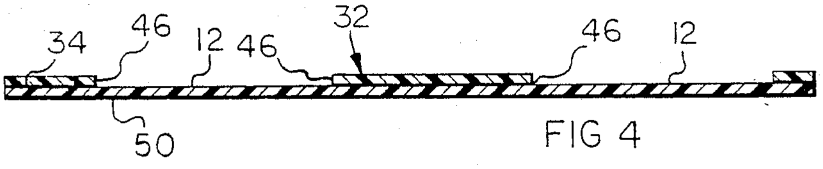
FIG. 4 is an elevational, sectional view taken through the banner illustrating in enlarged detail the removal of indicia and exposure of the banner face for painting.

In FIG. 4, the cross-sectional view illustrates the exposure of the banner face 12 after indicia has been removed between the slit edges 46. In such instance the remaining mask material defines a template or stencil wherein the indicia letters may be accurately painted upon the face 12.

While it is preferred that the indicia on a banner constructed in accord with the invention be painted upon the banner face 12, it is possible, in the practice of the invention, to form the indicia by the mask material, directly. In such instance, after cutting, the mask material around the indicia letters 48 is removed from the face 12.

After the unwanted mask material is removed from the banner face 12 and the banner has been painted and the application of the indicia to the face 12 completed, the lateral edge regions 15 of the banner will be folded toward the back surface 50 to form a loop or channel through which supporting ropes or cables for the banner may be threaded. The loops are sewn in place, and the formation of the loops places the holes 16 behind the banner face 12 and out of sight.

It is possible to practice the inventive concepts without forming the drive and orientation holes 16 if the plotter 38 is provided with frictional drive rollers which can accurately feed the laminated banner and mask material through the plotter without slippage. By using the orientation holes 16 slippage is prevented and an accurately formed banner is assured.

In that the practice of the invention only requires the banner material and the mask material the sheet material requirement is minimal, and by cutting the mask material while it is directly applied to the banner body, manufacturing costs are significantly minimized over the conventional method of forming banners as described above, the manufacturing time is substantially reduced, and a superior product is producible with nonskilled help.

It is appreciated that various modifications to the invention may be apparent to those skilled in the art without departing from the spirit and scope of the invention.

I claim:

1. The method of making an elongated flexible banner having a face, lateral edge regions and a central face region intermediate said edge regions, indicia being defined upon the central face region, comprising the steps of:

(a) laminating a flexible indicia forming mask material directly to the banner face region, (b) positioning the laminated mask material and banner relative to a computer controlled cutting machine, (c) cutting the mask material only by the computer controlled cutting machine to outline the indicia, (d) removing the banner from the cutting machine, (e) removing unwanted indicia forming mask material, from the banner central region face to define the desired indicia, (f) painting the exposed banner face, and (g) removing the remainder of the mask material to define a banner having only painted indicia.

* * * * *